United States Patent
Van Raemdonck et al.

(10) Patent No.: US 10,813,811 B2
(45) Date of Patent: Oct. 27, 2020

(54) CLAMP AND PATIENT LIFTING AIDS USING THE CLAMP

(71) Applicant: HANDI-MOVE, Ninove (BE)

(72) Inventors: Stefan Van Raemdonck, Herzele (BE); Paul Van Raemdonck, Geraardsbergen (BE)

(73) Assignee: HANDI-MOVE, Ninove (BE)

( * ) Notice: Subject to any disclaimer, the term of this patent is extended or adjusted under 35 U.S.C. 154(b) by 444 days.

(21) Appl. No.: 15/753,822

(22) PCT Filed: Aug. 24, 2016

(86) PCT No.: PCT/EP2016/069941
§ 371 (c)(1),
(2) Date: Feb. 20, 2018

(87) PCT Pub. No.: WO2017/032783
PCT Pub. Date: Mar. 2, 2017

(65) Prior Publication Data
US 2018/0311099 A1    Nov. 1, 2018

(30) Foreign Application Priority Data

Aug. 24, 2015 (EP) .................................... 15182198

(51) Int. Cl.
*A61G 7/10* (2006.01)
*A61G 7/053* (2006.01)
(Continued)

(52) U.S. Cl.
CPC ......... *A61G 7/1078* (2013.01); *A61G 7/0536* (2013.01); *F16B 2/005* (2013.01);
(Continued)

(58) Field of Classification Search
CPC .. A61G 7/1078; A61G 7/0536; A61G 7/1051; A61G 7/109; A61G 2203/78;
(Continued)

(56) References Cited

U.S. PATENT DOCUMENTS

| 229,348 | A | * | 6/1880 | Witter ..................... A44C 5/145 24/600.9 |
| 2,059,825 | A | * | 11/1936 | Talbott ..................... H02G 7/10 248/61 |

(Continued)

FOREIGN PATENT DOCUMENTS

| DE | 202008011503 U1 | 11/2008 |
| DE | 202009012946 U1 | 3/2010 |

(Continued)

OTHER PUBLICATIONS

International Search Report dated Nov. 2, 2016, issued in corresponding International Application No. PCT/EP2016/069941, filed Aug. 24, 2016, 3 pages.

(Continued)

*Primary Examiner* — Robert G Santos
*Assistant Examiner* — Alexis Felix Lopez
(74) *Attorney, Agent, or Firm* — Christensen O'Connor Johnson Kindness PLLC

(57) ABSTRACT

Disclosed is an assembly comprising a clamp, strap and rod. The strap is provided for suspending a load from the rod and/or clamp. The clamp comprises a gripping part for gripping around the rod, enabling a clamping of the clamp on the rod. The strap engages with the clamp along a first and second contact line. Two adjacent strap parts form an angle around the first contact line. When a load is suspended from the strap, the strap exerts a force on the clamp at the first contact line, pushing the clamp at the first contact line in a closing direction, pressing the gripping part against the (Continued)

rod. The gripping part is resilient and provided with a pretension for pressing against the rod when no load is suspended from the strap. Further disclosed are lifting aids using the clamp for lifting/repositioning patients with physical limitation.

40 Claims, 9 Drawing Sheets

(51) Int. Cl.
    *F16B 2/00*     (2006.01)
    *F16B 2/08*     (2006.01)

(52) U.S. Cl.
    CPC ............... *F16B 2/08* (2013.01); *A61G 7/109* (2013.01); *A61G 7/1051* (2013.01); *A61G 2203/78* (2013.01)

(58) Field of Classification Search
    CPC .... F16B 2/005; F16B 2/08; F16B 2/00; F16B 2/02; F16B 2/20
    See application file for complete search history.

(56) References Cited

U.S. PATENT DOCUMENTS

| | | | |
|---|---|---|---|
| 2,767,946 A * | 10/1956 | Weeks | F21V 19/009 248/50 |
| 4,837,874 A * | 6/1989 | Giercarz | A61G 7/1019 5/84.1 |
| 6,123,005 A | 9/2000 | Kuchta et al. | |
| 2011/0011251 A1 | 1/2011 | Truyman | |
| 2015/0305310 A1* | 10/2015 | Roberdeaux | F16B 2/08 24/130 |

FOREIGN PATENT DOCUMENTS

| | | | |
|---|---|---|---|
| EP | 2565493 A1 * | 3/2013 | ............ B43B 21/08 |
| EP | 2614988 A2 | 7/2013 | |
| FR | 2861584 A1 | 5/2005 | |
| FR | 2908489 A1 * | 5/2008 | ............. F16G 11/14 |
| WO | 2014/170346 A1 | 10/2014 | |
| WO | WO-2014170346 A1 * | 10/2014 | ........... A61G 7/1078 |

OTHER PUBLICATIONS

Written Opinion of the International Searching Authority dated Nov. 2, 2016, issued in corresponding International Application No. PCT/EP2016/069941, filed Aug. 24, 2016, 6 pages.

International Preliminary Report on Patentability and Written Opinion dated Feb. 27, 2018, issued in corresponding International Application No. PCT/EP2016/069941, filed Aug. 24, 2016, 7 pages.

* cited by examiner

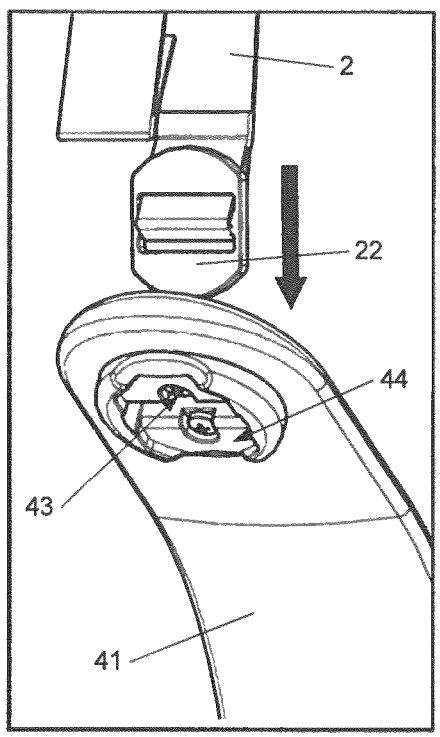
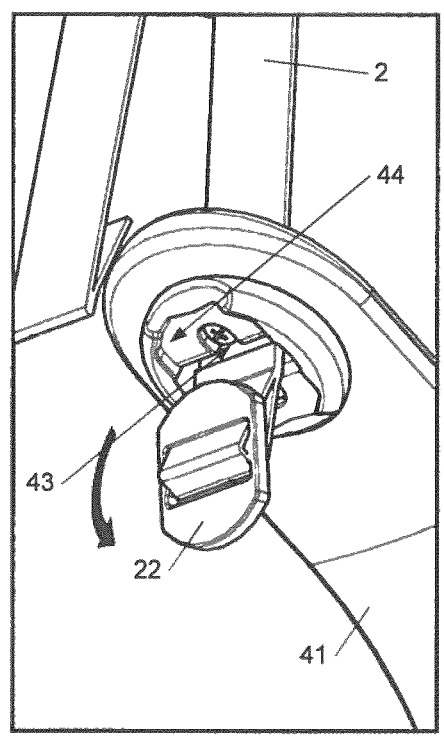
*Fig. 11a*     *Fig. 11b*

CLAMP AND PATIENT LIFTING AIDS USING THE CLAMP

FIELD OF THE INVENTION

The present invention relates to a clamp in an assembly with a rod and a strap, wherein the strap is able to secure the position of the clamp relative to the rod when a load is suspended from the strap. More particularly, the invention relates to the incorporation of such an assembly into a device for lifting a patient having a physical limitation, such as from a bed or from a swimming pool, and into a device for assisting in the repositioning of a patient in a bed. The invention also relates to a method for manufacturing such an assembly.

BACKGROUND OF THE INVENTION

Hoisting systems for moving persons are an important part of the equipment in e.g. private homes, group homes, swimming pools, a hospital or a nursing home. These enable moving entirely or partially immobile patients or inhabitants between their bed, wheelchair, toilet, bath, swimming pool, or other place of stay, without the care assistants having to do heavy lifting manually.

Hoisting systems of this type often consist of an overhead rail system with a carriage provided with a lifting motor or device or a hoisting device, which enables horizontal and vertical displacement, and a system to support the body suspended from the trolley or carriage, lifting device or hoisting device, which enables supporting the body of the patient during its movement. A body support or harness is typically put on the person, and the body support is connected to the hoisting system, typically via a connection.

The hoisting system is provided with one or more motors for performing the vertical movement. Moreover, the trolley may be connected with one or more motors performing the horizontal movement. Alternatively, horizontal and/or vertical movement may be effected manually by a care assistant pushing the hoisting system or the person to be moved. The hoisting system may alternatively, instead of being ceiling-mounted, be mounted on a mobile unit with wheels under it or mounted against a wall. The patient may hereby be moved independently of a fixed overhead rail system.

Operation of the various functions may be performed by the care assistant or by the person himself/herself via a control on the hoisting system or via a handheld control unit.

Examples of such hoisting systems are known from US 2006/0002252 or U.S. Pat. No. 6,523,195.

With all these systems, it is important that the strap is fastened to the body support in a safe way such that one avoids loosening the person to be lifted. This is achieved by a coupling which is disposed between the strap and the body support or directly on the frame of the hoisting system.

US 2005/0000016 A1 describes a device for lifting a patient comprising two arms with a cup mounted on each arm. The cups are provided for gripping the patient from opposite sides of the patient's thorax and are shaped accordingly. To improve the comfort of the patient, each arm of the lifting device is preferably provided with a leg support on which the legs of the patient may be carried. In this way the gripping force exerted on the patient's thorax is enhanced, since the weight of the legs is applied directly on the arms of the device for lifting a patient. Each leg support is suspended from one of the arms of the device for lifting a patient with a strap, which strap passes through an opening in the head of the leg support, wraps directly around the arm or around a sliding element provided around the arm, and both ends of the strap are secured in a buckle which allows adjusting the length of the strap.

For a number of reasons, the arms of the device for lifting a patient are provided with smooth surfaces. Suspending the leg supports from the arms of the device for lifting a patient in this manner has the disadvantage that the straps may move along the smooth surface of the arms in the longitudinal direction and/or may move transversally over the arms while the patient is being lifted. The movement of the straps relative to the arms may change the position of the leg supports, and thus also the position of the patient in the lifting device, which is undesirable because it is an important objective of the lifting device to maintain the patient in a stable position during the process of lifting. A change in position risks to bring the patient in an uncomfortable position, possibly suddenly changing his position away from the preferred seated position, i.e. with body and upper legs bent in a 90° angle, and hence may risk that the patient loses confidence in the device.

Hospital beds are typically provided with an overhead trapeze, which is a device to assist a patient in repositioning himself/herself in the bed, or to assist the patient getting in and out the bed. The position of the trapeze towards the position of the patient in the bed (lower in the bed, higher up the bed, . . . ) should preferably be adjustable in the horizontal direction as well as in the vertical direction for the patient. The overhead trapeze comprises a handle or handgrip which is suspended with a strap or a chain from an overhead bar or from a sliding element around the overhead bar, whereby the overhead bar typically runs along the entire length or part of the length of the bed, preferably central to the width of the bed. Pulling on the handgrip enables the patient to lift up his/her upper body and to change his/her position on the bed or enables the patient to get in or to get out of the bed. The position of the handgrip above the patient may be changed by adjusting the length of the strap or chain, and/or by moving the strap, the chain or the sliding element axially along the longitudinal axis of the overhead bar. In case a chain is used to suspend the handgrip from the overhead bar, the length of the chain may be adjusted by placing a hook provided in the head of the handgrip through one or more of the links of the chain. In case a strap is used to suspend the handgrip from the overhead bar, the length of the strap may be adjusted with a buckle or with an adjustment device provided on the handgrip such as disclosed in DE 20 2008 011 503 U1.

Suspending the strap from the overhead bar or from the sliding element in this manner has the disadvantage that the strap, the chain or the sliding element may move along the smooth surface of the overhead bar and then the position of the handgrip may change while the patient is adjusting his/her position in the bed or while he/she is moving in or out of the bed, which may cause the patient to fall back into the bed in an uncomfortable position, may cause the patient to hurt himself/herself, or may even cause the patient to fall out of the bed. One solution is to secure the sliding element to the overhead bar with a screw through the side of the sliding element which pushes against the surface of the overhead bar. This requires unscrewing and screwing each time the position of the sliding element along the overhead bar has to be changed, an operation which is time consuming, and with which there remains the risk that the screw is not screwed tightly enough whereby the sliding element may still move along the overhead bar, and which may damage the smooth surface of the overhead bar.

DE 219687 C discloses a clamping device for suspending the handle or the handgrip of an overhead trapeze from an overhead bar (g) of a hospital bed by means of a strap or chain. The clamping device is provided to clamp on the overhead bar when a patient pulls on the strap or chain from the handle or the handgrip, such that it is prevented from moving along the overhead bar. The clamping device comprises two plier shaped bars (a and b), which are at one end connected to each other by means of a hinge (c). At the opposing ends the plier shaped bars are provided with eyes which are connected to each other by means of a rope or chain (d). On this rope or chain hangs a ring (f) from which the handle or the handgrip is suspended by means of a strap or chain. A pulling force on the handle or the handgrip (e) is transferred via the connecting strap or chain and the ring towards the rope or chain connecting the eyes on the plier shaped bars. The force pulls the plier shaped bars towards each other, thereby clamping the clamping device on the overhead bar.

A disadvantage of such a clamping device is that certain parts of the device become subject to large forces when a load is suspended from it. These forces may be much stronger than the weight of the load. Such parts need to be made more bulky in size and in weight to be able to withstand these large forces. An example of these large forces is the tensile force in the rope or chain (d) connecting the eyes of the plier shaped bars, caused by a pulling force exerted by the patient on the handle or the handgrip (e). Each side of rope or chain needs to take its part of the vertical force component, i.e. half of the weight of the load, but due to the angle of the rope with vertical, also a significant horizontal component. The total force on each side of the rope or chain is therefore much higher than half of the weight of the load on the handgrip. This tensile force in the rope or chain transfers in full and sideways onto the plier shaped bars (a and b) of the clamping device, which therefore have to be constructed from a strong and heavy material and need to have appropriate dimensions to be able to withstand these forces. Another example of the large forces on the clamping device are the forces which act on the hinge (c) connecting the plier shaped bars. The strong force transferred by the rope or chain (d) onto the bars (a and b) at their point of attachment to the bars, i.e. at a significant distance from overhead bar (g), results, due to the lever effect and the much shorter distance from the hinge (c) to the overhead bar (g), in an even higher force being exerted on the hinge (c). The forces pulling on the plier shaped bars are thus concentrated and significantly amplified in the hinge, such that the hinge forms a weak part of the clamping device if it is not sufficiently strong.

Yet another disadvantage of such a clamping device is that the handle or the handgrip cannot be brought or positioned close to the overhead bar, which limits the movement range of the handle or the handgrip relative to the overhead bar. Firstly, the plier shaped bars need to have a certain length such that a lever is formed which enables the clamping of the clamping device on the overhead bar. This already positions the handle or the handgrip at a certain minimum distance below the overhead bar. Secondly, the rope or chain connecting the eyes of the plier shaped bars needs to bend downwards, if only to bring the force in the rope or chain to acceptable limits. This imposes an extra distance between the handle or the handgrip and the overhead bar.

Yet another disadvantage of such a clamping device is that the position of the clamping device is not secured with respect to the overhead bar when no pulling force is exerted by the patient on the handle or the handgrip. This may cause, for example, the clamping device to move unintentionally or accidentally out of a preferred position with respect to the overhead bar, requiring repositioning, which is inconvenient and even possibly unsafe for the patient, which may be a severely disabled patient.

DE 20 2009 012 946 U1 discloses a device to enable lying persons to upright themselves by their own force. The device comprises a bracket (8) with a handgrip (10). The bracket is connected to one end of a strap (1) by means of a holding body (3). The strap (1) is looped around an overhead bar (not shown) by means of a loop element (2).

The loop element of DE 20 2009 012 946 U1 has the drawback that the position of the strap on the overhead bar is not secured, particularly when not in use. This may cause, for example, the loop element and the strap to move unintentionally or accidentally out of a preferred position with respect to the overhead bar, requiring repositioning, which is inconvenient and even possibly unsafe for the lying person, which may be a severely disabled patient.

The present invention aims to obviate or at least mitigate the above described problems and/or to provide improvements generally.

SUMMARY OF THE INVENTION

According to the invention, there is provided an assembly of a clamp, a strap and a rod, wherein the assembly is provided such that the position of the clamp and/or the strap is secured relative to the rod when a load is suspended from the rod and/or the clamp by means of the strap, a device for lifting a patient comprising the assembly, a device to assist positioning or repositioning of a patient in a bed comprising the assembly, and a method for manufacturing the assembly as well as the other objects provided.

Therefore, the invention provides in an embodiment an assembly comprising a clamp and a strap and a rod, the strap having a longitudinal direction, the strap being suitable for possibly directly attaching a load for suspension from the rod and/or the clamp via at least one end of the strap, the clamp comprising a contractible gripping part provided for gripping around the rod for enabling a clamping of the clamp on the rod, the strap engaging with the clamp along a first contact line and along a second contact line, each contact line crossing the longitudinal direction of the strap, wherein the two parts of the strap adjacent to the first contact line form an angle around the first contact line, such that, when a load is suspended from the at least one end of the strap, the strap exerts a force on the clamp at the first contact line, said force pushing the clamp at the first contact line in a direction relative to the second contact line, said direction representing a closing direction of the clamp, thereby pressing the gripping part against the rod, wherein the gripping part is resilient, and wherein the gripping part is provided with a pretension for pressing against the rod even when no load is suspended from the at least one end of the strap.

Because the resilient gripping part is provided with a pretension, the gripping part already presses against the rod when no load is suspended from the strap, and this preferably with a predetermined amount of force. This offers the advantage that the position of the gripping part is already somewhat secured with respect to the rod before any load is suspended from the strap. In this way the clamp and the strap may less readily move accidentally or unintentionally relative to the rod when the assembly according to the present invention is not in use. In this way the clamp and the strap may readily be kept in a preferred position with respect to the rod. Subsequently suspending a load from the at least one end of the strap, presses the gripping part further against the rod, such that the position of the clamp and the strap with respect to the rod is even more firmly secured with respect to the rod.

The additional gripping force of the clamp on the rod caused by the pretension of the gripping part, also offers the advantage that lighter loads suspended from the at least one end of the strap also provide a sufficient gripping force of the clamp on the rod to firmly secure the position of the clamp and the strap with respect to the rod. This may be important, for example, for light-weight patients such as children and infants or for weaker patients such as the elderly.

The clamp comprising the gripping part brings the advantage that the strap may be made from a suitable flexible material, which does not necessarily needs to be resilient, while the clamp may be made from a suitable solid and resilient material.

We have further found, when the clamp of the assembly according to the present invention is moved in the closing direction by means of the force exerted on the clamp at the first contact line, e.g. because of the load, that the position of the gripping part, and thereby also the clamp, becomes further secured relative to the rod. This has the advantage that the clamp is even better prevented from sliding longitudinally, i.e. along the longitudinal axis of the rod. This also has the advantage that the clamp is better prevented from sliding transversally, i.e. along a direction transversal to the longitudinal axis of the rod. Because the strap is engaging with the clamp, the clamp being secured relative to the rod may also further secure the position of the strap, thereby preventing the strap from sliding longitudinally and/or transversally with respect to the rod.

When no load is suspended from the strap, the clamp and the strap may remain rather readily movable with respect to the rod by exerting a relatively small force, sufficient to overcome the pretension of the gripping part.

We have found that the strap forming an angle around the first contact line reduces the forces exerted on the clamp at the first contact line, which forces result from the tensile forces in the strap when a load is suspended from at least one end of the strap. These reduced forces are still sufficient to contract the gripping part around the rod such that the clamp is clamping around the rod, whereby the position of the clamp with respect to the rod is further secured. The reduced forces have, however, the advantage that the forces on the clamp itself are reduced and that smaller and/or light-weight embodiments of the clamp and/or the use of light-weight materials are made possible.

In this regard, the gripping part being provided with the pretension offers a larger choice for the angle of the strap around the first contact line. The pretension makes the gripping force of the clamp on the rod less dependent on the size of the load, such that only a smaller part of the load needs to be converted to a gripping force of the clamp on the rod in order to obtain a sufficient securing of the position of the clamp and the strap with respect to the rod.

Another advantage of the assembly according to the present invention is that the load which is suspended from the at least one end of the strap may be moved very closely to the clamp, i.e. up to very close to the first contact line between the clamp and the strap. Because the clamp may also be made smaller and/or lighter, because the clamp is subject to smaller forces, as explained above, the load may also be moved or positioned even closer to the rod. The assembly according to the invention thus allows a wider range of movement of the load, which is suspended from the strap, with respect to the clamp and also with respect to the rod.

Being able to position the load, which is suspended from the strap, closer to the clamp, has the additional advantage that the lever forces caused by the load onto the structure supporting the rod may have a smaller lever arm. This enables the use of more light-weight embodiments and the use of more light-weight materials for many parts of the supporting structure.

The gripping part being resilient is beneficial in operating the gripping part. On the one hand the resiliency is a simple means to provide the gripping part such that the first contact line, when it is pushed in the closing direction towards the second contact line, further presses the gripping part against the rod. On the other hand the resiliency also provides a simple means for returning the gripping part to its initial position when the load is removed from the strap, this without requiring further interaction with the gripping part.

In another embodiment, the invention provides a device for lifting a patient comprising two arms for gripping the patient from opposite sides of the patient's thorax and being shaped accordingly, and whereby from the arms leg supports are suspended with straps by means of the assembly according to the present invention.

The lifting device offers the advantage that when the patient is positioned with its legs in the leg supports, the gripping part is pressed stronger against the arm, which further secures the position of the clamp and the strap with respect to the arms. In this way the strap and the clamp are prevented from sliding on the arm of the lifting device while the patient is being carried in the lifting device, which sliding could cause the position of the patient in the lifting device to change in an unfavourable way which would be disturbing or even harmful for the patient. When the leg of the patient is moved out of the leg support or lifted upwards with respect to the leg support and thus no more load or at least no significant load is suspended from the strap, the clamp and the strap may again be allowed to move on the arm with the help of a light force on the gripping part to overcome the pretension of the gripping part, such that the position of the clamp and/or the strap from which the leg support is suspended from the arm may be adapted to the needs of patient.

Additionally, the arms of the lifting device may be provided with cups to be positioned underneath the armpits of the patient at opposite sides of the patient's thorax. The cups may be shaped at the top surface to grip underneath the armpits of the patient, and may be provided with a curvature corresponding to the curvature of the patient's thorax, and they may be mounted fixedly on the arms of the lifting device or they may be mounted tiltably on the arms of the lifting device such that their position may be changed according to the patient's thorax.

In another embodiment, the invention provides a device for assisting in the positioning or repositioning of a patient in a bed comprising a handgrip and a strap which is attached to the handgrip and suspended from an overhead bar above the bed by means of the assembly according to the present invention.

The device to assist positioning or repositioning of the patient in the bed offers the advantage that when the patient pulls the handgrip, the gripping part is pressed stronger against the overhead bar, which further secures the position of the clamp and the strap with respect to the overhead bar. In this way the strap and the clamp are prevented from sliding along the overhead bar while the patient adjusts his/her position in the bed by pulling on the handgrip. This ensures that the position of the handgrip does not change suddenly, which could cause the patient to hurt himself/herself. When the patient stops pulling the handgrip and thus no more load or at least no significant load is suspended from the strap, the clamp and the strap may again be allowed to move on the overhead bar with the help of a light force on the gripping part to overcome the pretension of the gripping part, such that the position from which the handgrip is suspended from the overhead bar may be adapted to the needs of the patient.

The use of the device to assist in the positioning or repositioning of a person in a bed is not limited to only the bed. The device may also be provided on a chair, on a club, on a sofa, on a seat, on a toilet, in a shower, or on other specialized equipment for the care of a patient which may require an adjustable handgrip.

In another embodiment, the invention provides a method for manufacturing the assembly according to the present invention, the method comprising the steps of:

providing a material for forming the clamp, and
 forming the clamp of the assembly by shaping the material for forming the clamp to a predetermined shape comprising the gripping part, the part of the clamp which comprises the first contact line and the part of the clamp which comprises the second contact line.

This method is very simple to perform, with a minimum of training for the technical staff. A single step production of the clamp may be made possible. The production also requires only one element of raw material, i.e. the metal wire. This offers further logistic advantages.

BRIEF DESCRIPTION OF THE DRAWINGS

FIG. 11 demonstrates how to connect the leg support of the assembly of FIG. 1 to the strap by means of a connection element.

DETAILED DESCRIPTION

Figure 1:
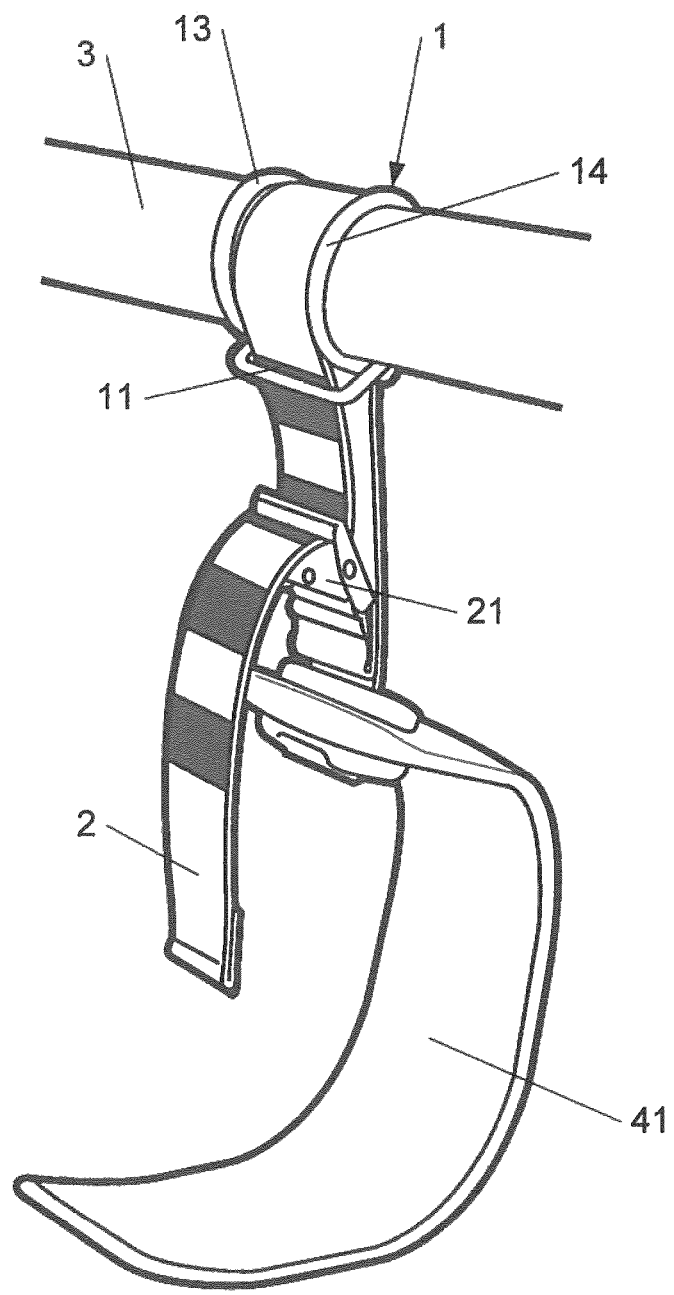
FIG. 1 shows a perspective view on an assembly of a clamp, a strap and a rod according to an embodiment of the present invention.

The present invention will be described in the following with respect to particular embodiments and with reference to certain drawings but the invention is not limited thereto but only by the claims. Any drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Within the context of the present invention an angle of X°, with X representing a number, is an angle of $(2\pi X)/360$ Radians. With $2\pi$ Radians corresponding to a full circle.

In an embodiment of the assembly according to the present invention, the clamp comprises a further gripping part for gripping around the rod for enabling a clamping on the rod.

The inventors have found that the further gripping part, in addition to the gripping part, is advantageous for increasing the gripping surface of the clamp onto the rod, and thereby the grip of the clamp on the rod, when a load is suspended from the at least one end of the strap, thereby more firmly securing the position of the clamp and the strap with respect to the rod. An additional advantage is that the clamp may be clamping onto the rod in several places simultaneously, whereby the clamp may be better immobilized relative to the rod.

In an embodiment of the assembly according to the present invention wherein the clamp comprises the further gripping part, the further gripping part is connected with the gripping part via the clamp part comprising the first contact line and/or the clamp part comprising the second contact line.

The further gripping part being connected with the gripping part via the clamp part comprising the first contact line and/or the clamp part comprising the second contact line offers the advantage that no additional clamp parts comprising additional contact lines have to be provided between the clamp and the strap for operating the further gripping part of the clamp, which simplifies the design of the clamp.

In an embodiment of the assembly according to the present invention wherein the clamp comprises the further gripping part, the further gripping part is connected at both ends with the gripping part, the two connections passing either via the clamp part comprising the first contact line or via the clamp part comprising the second contact line.

The two gripping parts of the clamp are thus separated from each other, each time by a clamp part comprising one of the contact lines, and conversely, the two clamp parts comprising the contact lines are separated from each other by the two gripping parts. These separations allow to have a distance between the two gripping parts, and also a distance between the two contact lines, which offers on the one hand better ways to immobilize the clamp relative to the rod, and on the other hand more flexibility in the closing mechanism of the clamp.

In an embodiment of the assembly according to the present invention wherein the clamp comprises the further gripping part, the further gripping part grips around the rod at a distance from where the gripping part grips around the rod.

This brings the advantage that rotation of the clamp may be further prevented, when the clamp is closing or closed under the force of the suspended load, around an axis perpendicular to the longitudinal axis of the rod.

In an embodiment of the assembly according to the present invention wherein the clamp comprises the further gripping part at a distance from the gripping part, the strap passes through the clamp in between the gripping part and the further gripping part.

This offers the additional advantage that the strap engaging with the clamp at the first contact line and at the second contact line becomes confined and constrained in movement relative to the rod by the gripping part and the further gripping part from opposing sides, which aids in preventing the strap from sliding over the rod along the longitudinal axis of the rod, and may further assist in preventing the strap from sliding off the clamp parts comprising the contact lines and from disengaging from the clamp. As such, the gripping part and the further gripping part form a holding means for the strap.

In an embodiment of the assembly according to the present invention wherein the clamp comprises the further gripping part, the further gripping part is resilient.

The further gripping part being resilient is beneficial in operating the further gripping part. On the one hand the resiliency is a simple means to provide the further gripping part such that the first contact line, when it is pushed in the closing direction towards the second contact line, presses the further gripping part against the rod. On the other hand the resiliency also provides a simple means for returning the further gripping part to its initial position when the load is removed from the strap, this without requiring further interaction with the further gripping part.

In an embodiment of the assembly according to the present invention wherein the clamp comprises the resilient further gripping part, the further gripping part is provided with a pretension for pressing against the rod even when no load is suspended from the at least one end of the strap.

Because the resilient further gripping part is provided with a pretension, the further gripping part already presses against the rod when no load is suspended from the strap, and this preferably with a predetermined amount of force. This offers the advantage that the position of the further gripping part is already somewhat secured with respect to the rod before any load is suspended from the strap. In this way the clamp and the strap may not move accidentally or unintentionally relative to the rod when the assembly according to an embodiment of the present invention is not in use. In this way the clamp and the strap may readily be kept in a preferred position with respect to the rod. Subsequently suspending a load from the at least one end of the strap, presses the further gripping part further against the rod, such that the position of the clamp and the strap with respect to the rod is more firmly secured with respect to the rod.

In an embodiment of the assembly according to the present invention the first contact line and the second contact line run substantially parallel, and preferably parallel, with respect to each other.

The first contact line and the second contact line running substantially parallel with respect to each other offers the advantage that forces on the first contact line and on the second contact line will not give rise to a rotational component in the movement of the clamp on the rod, which may lead to an undesired rotation of the clamp, and which may also lead to undesired sideway forces on certain parts of the clamp.

In an embodiment of the assembly according to the present invention the clamp comprises holding means for preventing the strap from sliding with respect to the clamp over the rod along a direction parallel to a longitudinal axis of the rod when the strap is exerting a force on the clamp along the first contact line and along the second contact line.

The holding means offer the advantage of preventing the strap from sliding off the parts of the clamp comprising the contact lines and thereby disengaging from the clamp.

This is beneficial for the safe usage of the assembly according to an embodiment of the present invention. If the strap would slide off the parts of the clamp comprising the contact lines, then the load suspended from the rod and/or the clamp via the strap would suddenly move to a different position on the rod or could even fall, if only suspended from the clamp. This could cause damage to the suspended load, such as for example a person using the device for lifting the patient according to the present invention or the device for assisting in the positioning or repositioning of a patient in a bed according to the present invention. The strap sliding off the parts of the clamp comprising the contact lines would also reduce the reliability of the operation of the assembly according to the present invention.

In an embodiment of the assembly according to the present invention the clamp is provided such that, when no load is suspended from the strap, the clamp is manually pushable at the first contact line in a direction relative to the second contact line and opposite to the closing direction of the clamp and/or strap, said direction representing an opening direction of the clamp and/or strap, thereby releasing a gripping pressure or force from the gripping part against the rod.

The clamp which is provided for being opened manually offers the advantage of being easy to reposition with respect by the rod. Therefore, the clamp only needs to be opened by pushing the clamp at the part comprising the first contact line in the opening direction with respect to the second contact line and the clamp and strap may then readily be moved over the rod. Being able to open the clamp removes any possible friction between the gripping part and the rod, such that the clamp and the strap may be moved easily on the rod without much resistance.

In an embodiment of the assembly according to the present invention the strap is suitable for directly attaching a load for suspension from the rod via at least one end of the strap.

Suspending the load from the rod via at least one end of the strap offers the advantage that the weight of the load is carried by the rod and that the clamp is only subjected to the force at the first contact line when a load is suspended from the strap, which does not necessarily have to be as large as the weight of the load, but only sufficient to push the clamp at the first contact line in the closing direction with respect to the second contact line and enable the pressing of the gripping part against the rod. In this way, the forces which the clamp needs to be able to withstand are smaller, such that smaller light-weight embodiments of the clamp and/or the use of light-weight materials are possible.

In an embodiment of the assembly according to the present invention the clamp is arranged such that the force exerted on the clamp at the first contact line, when a load is suspended from the at least one end of the strap, pushes the clamp at the first contact line in a direction away from the second contact line.

This embodiment offers the advantage that the strap may be arranged between the parts of the clamp with which the clamp engages with the strap at the first contact line and the second contact line. This is beneficial in maintaining the position of the strap with respect to the clamp to ensure proper operation of the assembly according to an embodiment of the present invention.

If, in addition, the clamp is also provided for being manually opened by pushing the clamp at the first contact line in the opening direction relative to the second contact line, then this embodiment also offers the advantage of that the opening of the clamp is easy to be performed single-handedly by pushing the clamp at the part comprising the first contact line in a direction towards the part comprising the second contact line. This is much easier to do than, for example, single-handedly pushing the clamp at the part comprising the first contact line in a direction away from the second contact line. In this way, the second hand of a person using the assembly according to an embodiment of the present invention remains free to perform other tasks while the clamp is being opened, such as holding on to a support for the patient who wants to reposition the clamp and the strap relative to the rod.

In an embodiment of the assembly according to the present invention the two parts of the strap adjacent to the second contact line form an angle around the second contact line, such that, when a load is suspended from at least one end of the strap, the strap exerts a further force on the clamp at the second contact line, said further force pushing the clamp at the second contact line in a direction relative to the first contact line, said direction representing the closing direction of the clamp, thereby pressing the gripping part against the rod.

With this embodiment, not only the part of the strap engaging with the clamp at the first contact line exerts a force on the clamp for pressing the gripping part against the rod, but also the part of the strap engaging with the clamp at the second contact line exerts a force, i.e. the further force, on the clamp for pressing the gripping part against the rod. This offers the advantage that the gripping part is more strongly pressed against the rod, which results in a more firmly securing of the position of the gripping part, and thus also of the clamp and the strap, against the rod. The forces being exerted on the clamp at both the first contact line and the second contact line also offers the advantage that forces for pressing the gripping part against the rod are more evenly distributed over the clamp, which results in a better controlled pressing of the gripping part against the rod.

In an embodiment of the assembly according to the present invention the angle around the first contact line formed by the two parts of the strap adjacent to the first contact line, and/or, if present, the angle around the second contact line formed by the two parts of the strap adjacent to the second contact line, is in the range from 90° to 170°.

Increasing the size of the angle around the first contact line formed by the two parts of the strap adjacent to the first contact line decreases the force which is exerted by the strap on the clamp at the first contact line when a load is suspended from the at least one end of the strap, and decreasing the size of said angle increases said force. The inventors have found that the angle being in the range from 90° to 170° offers a good balance between on the one hand the force exerted by the strap on the clamp at the first contact line being sufficiently large to contract the gripping part around the rod such that the clamp is clamping around the rod and on the other hand the force exerted by the strap on the clamp at the first contact line being small enough to not to overload the clamp such that smaller and/or light-weight embodiments of the clamp and/or the use of light-weight materials are possible. It should be clear that the same advantages apply for the angle around the second contact line formed by the two parts of the strap adjacent to the second contact line being in the range from 90° to 170°.

In an embodiment of the assembly according to the present invention the force exerted by the strap on the clamp at the first contact line when a load is suspended from the at least one end of the strap, and/or, if present the force exerted by the strap on the clamp at the second contact line when a load is suspended from the at least one end of the strap, is in the range from 5 N to 2000 N, preferably in the range from 10 N to 1500 N, more preferably in the range from 15 N to 1000 N, even more preferably in the range from 20 N to 500 N.

The inventors have found that force exerted by the strap on the clamp at the first contact line, when a load is suspended from the at least one end of the strap, being in this range offers a good balance between on the one hand said force being sufficiently large to contract the gripping part around the rod such that the clamp is clamping around the rod and on the other hand said force being small enough to not to overload the clamp such that smaller and/or light-weight embodiments of the clamp and/or the use of light-weight materials are possible. It should be clear that the same advantages apply for the force exerted by the strap on the clamp at the second contact line, when a load is suspended from the at least one end of the strap, being in this range.

In an embodiment of the assembly according to the present invention the first contact line and the second contact line cross the longitudinal direction of the strap at an angle in the range from 45° to 135, preferably in the range from 60° to 120°, more preferably in the range from 75° to 105°, even more preferably in the range from 85° to 95°, yet even more preferably in the range from 88° to 92°, and most preferably of 90°.

The inventors have found that the first contact line and the second contact line crossing the longitudinal direction of the strap at such an angle offers the advantage that the forces being exerted on the clamp at the first contact line and at the second contact line are more evenly distributed along the first contact line and along the second contact line, resulting in an equal load on the different parts of the clamp.

In an embodiment of the assembly according to the present invention the clamp is manufactured from a material selected from the list consisting of plastic, fibre reinforced plastic, metal, iron, steel, stainless steel, spring steel and stainless spring steel, preferably spring steel and more preferably stainless spring steel.

Using plastic or a fibre reinforced plastic has the advantage that the clamp may easily be formed by means of injection moulding in a mould having the predetermined shape of the clamp.

Using metal has the advantage that the clamp may easily be formed from a straight wire which is bent to a predetermined shape of the clamp.

Using spring steel or stainless spring steel as material for the clamp is advantageous for providing the clamp with an integrated resilient gripping part. In this way, no additional means need to be provided to provide the resiliency of the gripping part.

Using stainless steel or stainless spring steel brings the additional advantage that the clamp may be used in a humid environment, such as bathrooms, swimming pools, etc.

In an embodiment of the assembly according to the present invention the clamp is a single integral part.

The clamp being a single integral part offers the advantage that the clamp is simple in design and requires no assembling. Therefore, the clamp is easy and quick to manufacture, and the assembly according to the present invention is easy and quick to assemble.

In an embodiment of the assembly according to the present invention the clamp is manufactured from a bent wire.

The clamp manufactured from a wire bent to a predetermined shape, or having a bent shape according to a predetermined shape, offers the advantage that it is easy and quick to manufacture. The bent wire clamp is also beneficial for providing a light-weight embodiment of the clamp of sufficient strength.

In an embodiment of the assembly according to the present invention at least a part of the surface of the clamp which is provided for clamping on the rod is provided with an anti-slip finishing.

The anti-slip finishing on the part of the surface of the clamp which is provided for clamping on the rod, such as the gripping part, increases the grip of the clamp on the rod. The anti-slip finishing is thus beneficial for a more firmly securing of the position of the clamp and the strap with respect to the rod with or without a load being suspended from the strap, as the anti-slip finishing forms an additional means to prevent the clamp from sliding on the rod.

In an embodiment of the assembly according to the present invention at least a part of the surface of the clamp which is provided for contacting the strap is provided with an anti-slip finishing.

The anti-slip finishing on the part of the surface of the clamp which is provided for contacting the strap, such as the first contact line and/or the second contact line, is beneficial to prevent the strap from sliding off the parts of the clamp comprising the contact lines and thereby disengaging from the clamp. As such, the anti-slip finishing forms a holding means for the strap.

In an embodiment of the assembly according to the present invention the strap forms a loop.

The strap forming a loop is beneficial for preventing the strap from possibly sliding off the rod and/or clamp and thereby detaching from the rod and/or clamp, which might cause damage to the load which is suspended from the at least one end of the strap.

The inventors have also found that the strap forming a loop is also beneficial for providing the assembly according to an embodiment of the present invention in such a way that the strap forms an angle around both the first contact line and the second contact line for exerting a force on the clamp at respectively the first contact line and the second contact line when a load is suspended from the at least one end of the strap, i.e. from a part of the strap lying along the loop formed by the strap.

In an embodiment of the assembly according to the present invention the strap is provided with an adjusting element, such as a buckle, for adjusting the length of the part of the strap from which the load is to be suspended.

The inventors have found the adjusting element arranged on the strap to be a quick and easy means for changing the distance between the load on the one hand and the rod and the clamp on the other hand when the load is suspended from the strap, and/or for changing the length of the strap prior to suspending the load such that the load may be suspended at a desired distance from the rod and the clamp. In the device for lifting a patient or the device for assisting in the positioning or repositioning of a patient in a bed according to embodiments of the present invention, being able to quickly and easily change said distance adds to the comfort of the patient or person using said devices.

In an embodiment of the assembly according to the present invention the assembly further comprises a support element connected to the at least one end of the strap, which support element is provided for supporting a load which is to be suspended from the at least one end of the strap.

The inventors have found the dedicated support element to be a beneficial means to quickly and easily suspend a load from the rod and/or clamp via the strap, which also guarantees a proper and safe suspension of the load. In the device for lifting a patient or the device for assisting in the positioning or repositioning of a patient in a bed according to embodiments of the present invention, this adds to the comfort and safety of the patient or person using said devices.

In an embodiment of the assembly according to the present invention comprising the support element, the support element is connected to the at least one end of the strap by means of a connection element provided on the at least one end of the strap and by means of a connection slot on the support element, wherein the connection element and the connection slot cooperate for forming the connection.

The inventors have found that the support element and the connection element which are provided as such offer the advantage that the support element may be connected quickly and easily to the strap and also that the support element may be disconnected quickly and easily from the strap, while still guaranteeing a strong connection between the support element and the strap when both are connected. This allows, for example, a certain type of support element adapted to one kind of load to be quickly and easily replaced by another type of support element adapted to another kind of load, if the application so desires. In the device for lifting a patient or the device for assisting in the positioning or repositioning of a patient in a bed according to embodiments of the present invention, this adds to the comfort and safety of the patient or person using said devices.

In an embodiment of the assembly according to the present invention comprising the connection element and the support element with the connection slot, the connection element and the connection slot are dimensioned such that the connection element, in a first orientation of the connection element, is able to pass through the connection slot to allow connecting and disconnecting of the strap and the support element, and such that the connection element, in a second orientation of the connection element, seats behind the sides of the connection slot for connecting the strap and the support element.

The inventors have found that the support element and the connection element which are provided as such offer the advantage that the support element may be connected quickly and easily to the strap and also that the support element may be disconnected quickly and easily from the strap, while still guaranteeing a strong connection between the support element and the strap when both are connected. This allows, for example, a certain type of support element adapted to one kind of load to be quickly and easily replaced by another type of support element adapted to another kind of load, if the application so desires. In the device for lifting a patient or the device for assisting in the positioning or repositioning of a patient in a bed according to embodiments of the present invention, this adds to the comfort and safety of the patient or person using said devices.

In an embodiment of the method according to the present invention the predetermined shape further comprises the further gripping part.

In an embodiment of the method according to the present invention the material for forming the clamp is a plastic, more preferably a fibre reinforced plastic, and the step of forming the clamp comprises injection moulding the plastic to the predetermined shape.

In an embodiment of the method according to the present invention the material for forming the clamp is a metal wire, preferably a steel wire, more preferably a spring steel wire, and even more preferably a stainless spring steel wire, having a first end and a second end, and wherein the step of forming the clamp comprises bending the metal wire to the predetermined shape.

In an embodiment of the method according to the present invention where the clamp is formed by bending the metal wire, the metal wire is bent such that the first end and the second end of the metal wire are approaching each other, and the method further comprises the step of welding the first end and the second end of the metal wire to each other.

In an embodiment of the method according to the present invention the method further comprises the steps of:
  providing a rod,
  providing a strap having a longitudinal direction, and
  arranging the clamp and the strap on the rod with the gripping part and, if present, the further gripping part gripping around the rod, and with the strap engaging with the clamp along the first contact line and along the second contact line.

Thanks to the resilience of the clamp material, a light force is sufficient for opening the clamp somewhat, wide enough such that the clamp may readily be moved correctly over the rod, so that the different parts of the assembly may readily be assembled with a low effort.

In an embodiment of the method according to the present invention the method further comprises the steps of:
  providing a support element which is provided for supporting a load which is to be suspended from the at least one end of the strap, and
  connecting the support element to the at least one end of the strap from which the load is to be suspended.

In an embodiment of the method according to the present invention the rod is an arm of a device for lifting a patient, and the support element is a leg support of the device for lifting a patient.

In an embodiment of the method according to the present invention the rod is an overhead bar of a device for assisting in the repositioning of a person in a bed, and the support element is a handgrip of the device for assisting in the repositioning of a person in a bed.

Figure 2:
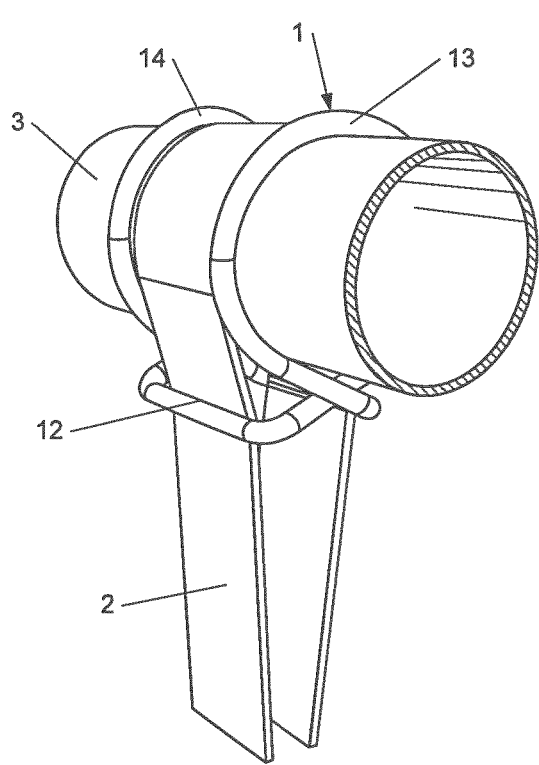
FIGS. 2 and 3 respectively show a perspective view and a side view on a detail of the assembly of FIG. 1.
Figure 3:
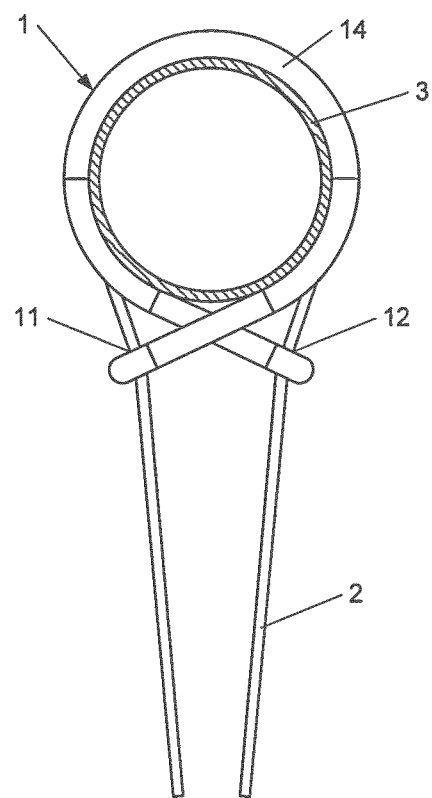
Figure 4:
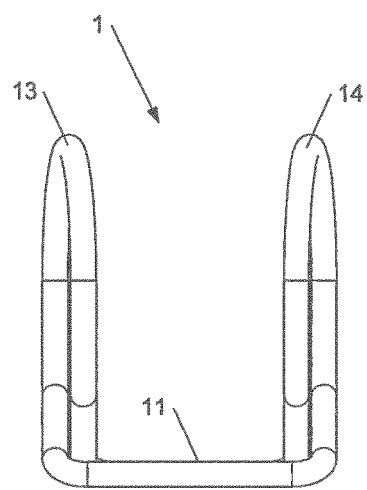
FIGS. 4-6 respectively show a front view, a side view and a bottom view on the clamp of the assembly of FIG. 1.
Figure 5:
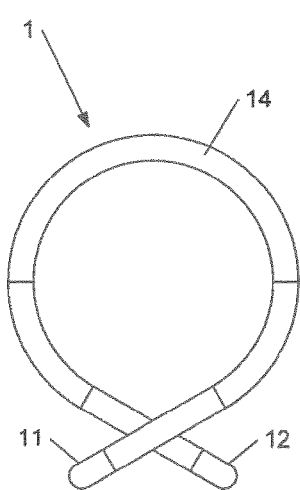
Figure 6:
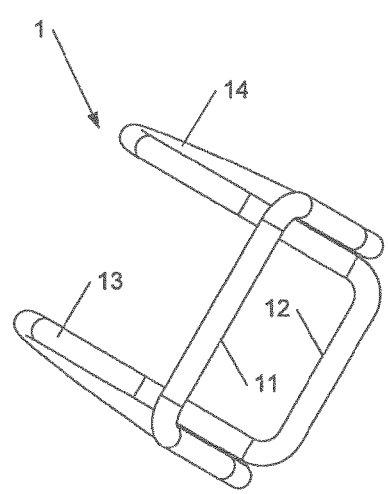

FIG. 1 shows a perspective view on an assembly of a clamp 1, a strap 2 and a rod 3 according to the present invention. FIGS. 2 and 3 show a more detailed view on a part of the same assembly as shown in FIG. 1, respectively in a perspective view and a side view. FIGS. 4-6 shows the clamp 1 of the assembly in more detail from different sides, respectively in a front view, a side view and a bottom view.

Figure 7:
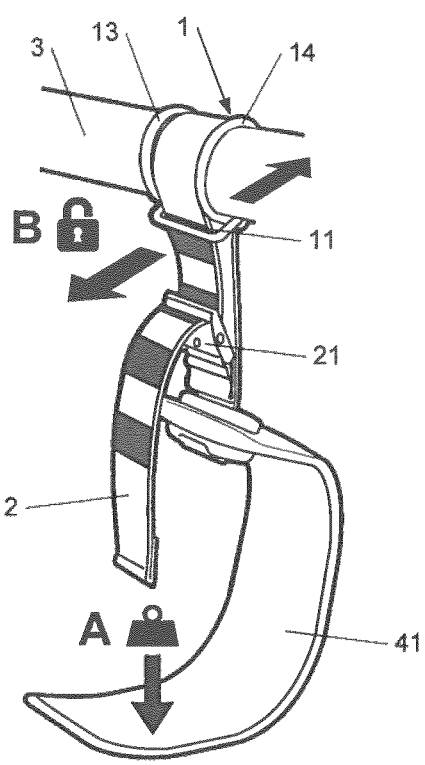
FIGS. 7 and 8 respectively show a perspective view and a detailed side view on the assembly of FIG. 1 indicating the closing direction of the clamp.
Figure 8:
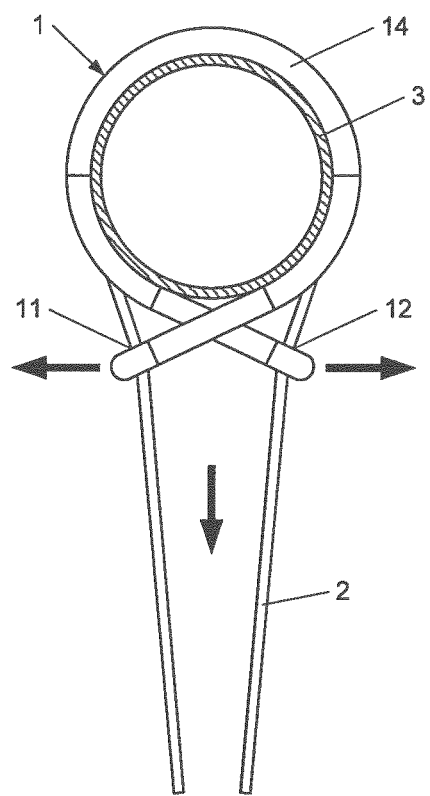
Figure 9:
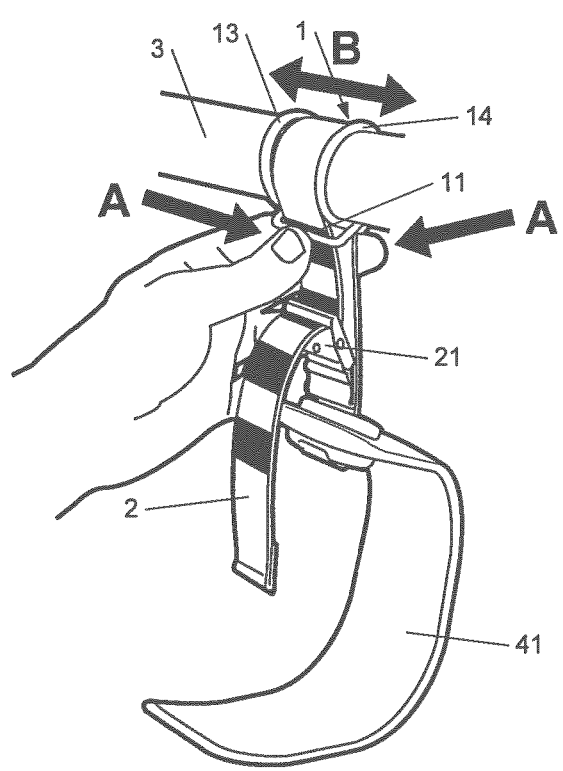
FIGS. 9 and 10 respectively show a perspective view and a detailed side view on the assembly of FIG. 1 indicating the opening direction of the clamp.
Figure 10:
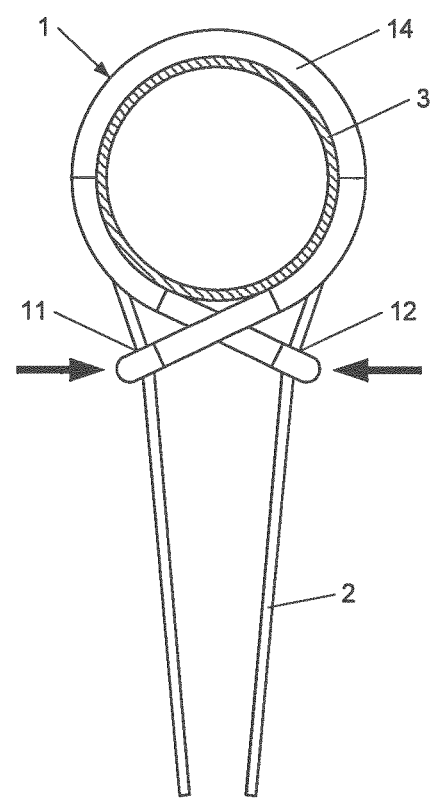

The assembly will now be further discussed with respect to these figures and with respect to FIGS. 8 and 7 wherein the closing of the clamp 1 is demonstrated, respectively in a perspective view and in a detailed side view, and with respect to FIGS. 9 and 10 wherein the opening of the clamp 1 is demonstrated, respectively in a perspective view and in a detailed side view.

In this embodiment, the rod 3 is provided as a tube 3 with a circular cross section which extends along a longitudinal direction. The rod 3 may in different embodiments however also be a solid rod instead of a hollow tube and may have other shapes in cross section.

The strap 2 is a narrow usually flat strip of a flexible material. The strap 2 extends along a longitudinal direction and is suitable for possibly directly attaching a load for suspension from the rod 3 and/or the clamp 1 via at least one end of the strap 2.

The clamp 1 is formed by a bent metal wire, preferably a bent stainless spring steel wire, of which the ends are welded to each other.

The clamp 1 is arranged on the rod 3 and the strap 2 forms a loop which runs over the rod 3 and through the clamp 1. The strap 2 is provided for being connected to a load which is to be suspended from the rod 3 and/or the clamp 1. In this embodiment, the strap 2 runs over the rod 3 in such a way that the longitudinal direction of the strap 2 crosses, and is preferably perpendicular to, the longitudinal direction of the rod 3. In this way a load suspended from the strap 2 is suspended from the rod 3, such that the rod 3 substantially carries the weight of the suspended load.

Figures 12A, 12B, 12C, 12D, 12E:
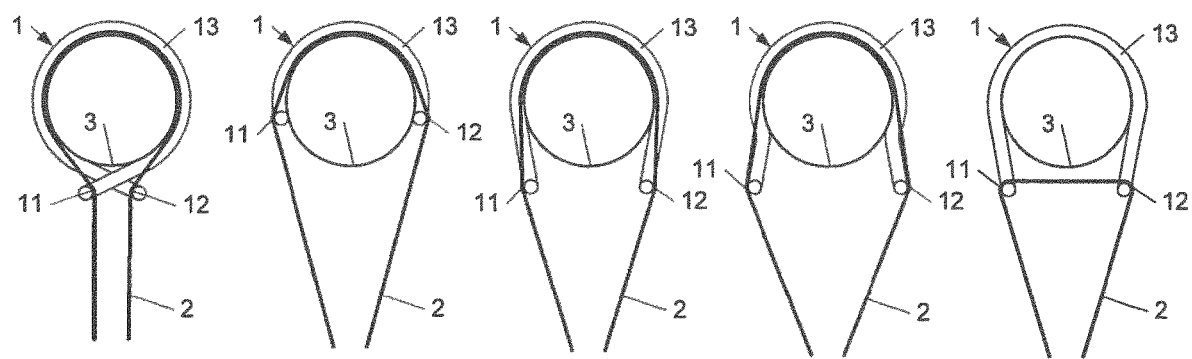
FIGS. 12*a-g* show a series of alternative embodiments of the assembly according to the present invention.
Figures 12F, 12G:
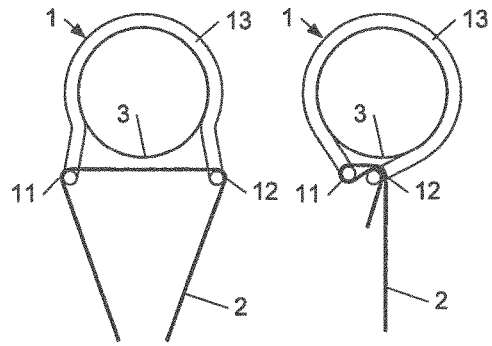

In alternative embodiments the strap does not run over the rod, but may also pass only through the clamp, such as for example shown in FIGS. 12e-g. In this way a load suspended from the strap 2 is suspended from the clamp 1, such that the clamp 1 substantially carries the weight of the suspended load.

The strap 2 engages with the clamp 1 at a first contact line 11 and at a second contact line 12. As for example can be seen in FIG. 3, the parts of the strap 2 adjacent to the first contact line 11 and the parts of the strap 2 adjacent to the second contact line 12 form an angle around respectively the first contact line 11 an the second contact line 12. When a load is suspended from the strap 2, the tension forces in the strap 2 generate a force on the clamp 1 at the first contact line 11 and at the second contact line 12 because of the angle the strap forms around the first contact line 11 and around the second contact line 12. The angle between the two parts of the strap 2 adjacent to the first contact line 11 and the angle between the two parts of the strap 2 adjacent to the second contact line 12 preferably are in the range from 90° to 170°. The force exerted on the clamp 1 at the first contact line 11 and the force exerted on the clamp 1 at the second contact line 12 preferably lie within the range going from 10 N to 2000 N.

The clamp 1 comprises a gripping part 13 and a further gripping part 14 which are provided for gripping around the rod 3. The gripping part 13 and the further gripping part 14 have an a-shape which provides an opening through which the rod 3 is passed for arranging the clamp 1 on the rod 3.

The gripping part 13 and the further gripping part 14 are arranged at a predetermined distance from each other such that the strap 2 is able to pass between the gripping part 13 and the further gripping part 14. The predetermined distance between the gripping part 13 and the further gripping part 14 is preferably only a bit larger than the width of the strap 2 to limit the movement of the strap 2 between the gripping part 13 and the further gripping part 14. The gripping part 13 and the further gripping part 14 are connected with each other via a part of the clamp 1 which provides the first contact line 11 for contacting and engaging with the strap 2 and via a part of the clamp 1 which provides the second contact line 12 for contacting and engaging with the strap 2. These clamp parts run substantially parallel, and preferably parallel, with each other and with the longitudinal direction of the rod 3 when the clamp 1 is arranged on the rod 3. In this configuration the gripping part 13, the further gripping part 14, the clamp part providing the first contact line 11 and the clamp part providing the second contact line 12 form a holding means for the strap 2, which drags the strap 2 along with the clamp 1 when the clamp 1 is moved along the rod 3, and which prevents the strap 2 from sliding of the clamp 1 when the strap 2 is for example exerting a force on the clamp 1.

The gripping part 13 and the further gripping part 14 are resilient, and in general at least contractible. This allows, such as shown in FIGS. 7 and 8, a force on the clamp 1 at the first contact line 11 to move the clamp 1 at the first contact line 11 in a direction away from the second contact line 12, and a force the clamp 1 at the second contact line 12 to move the clamp 1 at the second contact line 12 in a direction away from the first contact line 11, i.e. a closing direction of the clamp 1. The force applied on the clamp 1 in the closing direction may for example be the force exerted on the clamp 1 at the first contact line 11 and at the second contact line 12 when a load is suspended from the at least one end of the strap. Moving the clamp 1 at the first contact line 11 and at the second contact line 12 in the closing direction decreases the radius of curvature of the circular section of the gripping part 13 and the further gripping part 14, thereby pressing the gripping part 13 and the further gripping part 14 stronger against the rod 3, such that the position of the clamp 1 with respect to the rod 3 is better secured.

The gripping part 13 and/or the further gripping part 14 are also provided with a pretension, such that when no forces are applied on the clamp 1 the gripping part 13 and/or the further gripping part 14 already press, preferably with a predetermined amount of force, against the rod, thereby already somewhat securing the position of the clamp 1 with respect to the rod 3. To provide the pretension, the circular section of the gripping part 13 and the further gripping part 14 may, for example, be provided with a radius of curvature which is only slightly smaller than the external radius of the rod 3.

When the position of the clamp 1 with respect to the rod 3 is secured, the clamp 1 may be opened, such as shown in FIGS. 9 and 10, by applying a force on the clamp 1 at the first contact line 11 which moves the clamp 1 at the first contact line 11 in a direction towards the second contact line 12, and by applying a force on the clamp 1 at the second contact line 12 which moves the clamp 1 at the second contact line 12 in a direction towards the first contact line 11, i.e. the opening direction of the clamp 1. Such a force may be applied manually, such as demonstrated in FIG. 9, but may also arise from the resiliency of the gripping part and the further gripping part. For example, in case no forces are applied on the clamp 1, a manual force may be applied on the clamp 1 in the opening direction to overcome the pretension, and in case a previously applied force on the clamp 1 in the closing direction is released, the resiliency of the gripping part 13 and the further gripping part 14 may provide the force for opening the clamp 1 until the clamp 1 only presses with the pretension against the rod 3. Moving the clamp 1 at the first contact line 11 and at the second contact line 12 in the opening direction increases the radius of curvature of the circular section of the gripping part 13 and the further gripping part 14, thereby stopping the gripping part 13 and the further gripping part 14 from pressing against the rod 3, such that the clamp 1 is freely moveable with respect to the rod 3.

In alternative embodiments the clamp 1 may be provided such that a force on the clamp 1 in the closing direction moves the clamp 1 at the first contact line 11 in a direction towards the second contact line 12 and at the second contact line 12 in a direction towards the first contact line 11, and such that a force on the clamp 1 in the opening direction moves the clamp 1 at the first contact line 11 in a direction away from the second contact line 12 and at the second contact line 12 in a direction away from the first contact line 11. Examples of such embodiments are shown in FIGS. 12b-g.

In this embodiment, the assembly is further provided with an adjusting element 21, more specifically a buckle 21, arranged on the strap 2. The adjusting element 21 is provided for adjusting the length of the strap 2, such that the distance between a suspended load and the rod 3 and clamp 1 may be adapted, for example to a specific application or to the specific needs of a person using the assembly.

In this embodiment, the assembly is further provided with a support element 41, more specifically a leg support 41, which is connected to the strap 2. The support element 41 is provided for supporting a load suspended from the strap 2, or for at least facilitating suspending a load from the strap 2.

As shown in FIG. 11, the strap 2 is provided with a connection element 22 and the support element 41 is provided with a connection slot 43 for connecting the strap 2 and the support element 41. The connection element 22 and the connection slot 43 are dimensioned such that the connection element 22 is able to pass through the connection slot 43 in a first orientation, such as shown in the left part of FIG. 11. In this way, the connection element 22 and the strap 2 may be inserted through the connection slot 43 for connecting the strap 2 and the support element 41, and in the other direction the connection element 22 and the strap 2 may also be pulled back through the connection slot 43 for disconnecting the strap 2 and the support element 41. The connection element 22 and the connection slot 43 are also dimensioned such that, when the connection element 22 has been inserted through the connection slot 43, the connection element 22 seats behind the sides of the connection slot 43. In this way the support element 22 supports on the connection element 22 for connecting the strap 2 and the support element 41. In this embodiment, the support element 41 is even provided with a connection recess 44 around the connection slot 43 and having a shape substantially complementary to the shape of the connection element 22, in which connection recess 44 the connection element 22 is seated.

Figure 13:
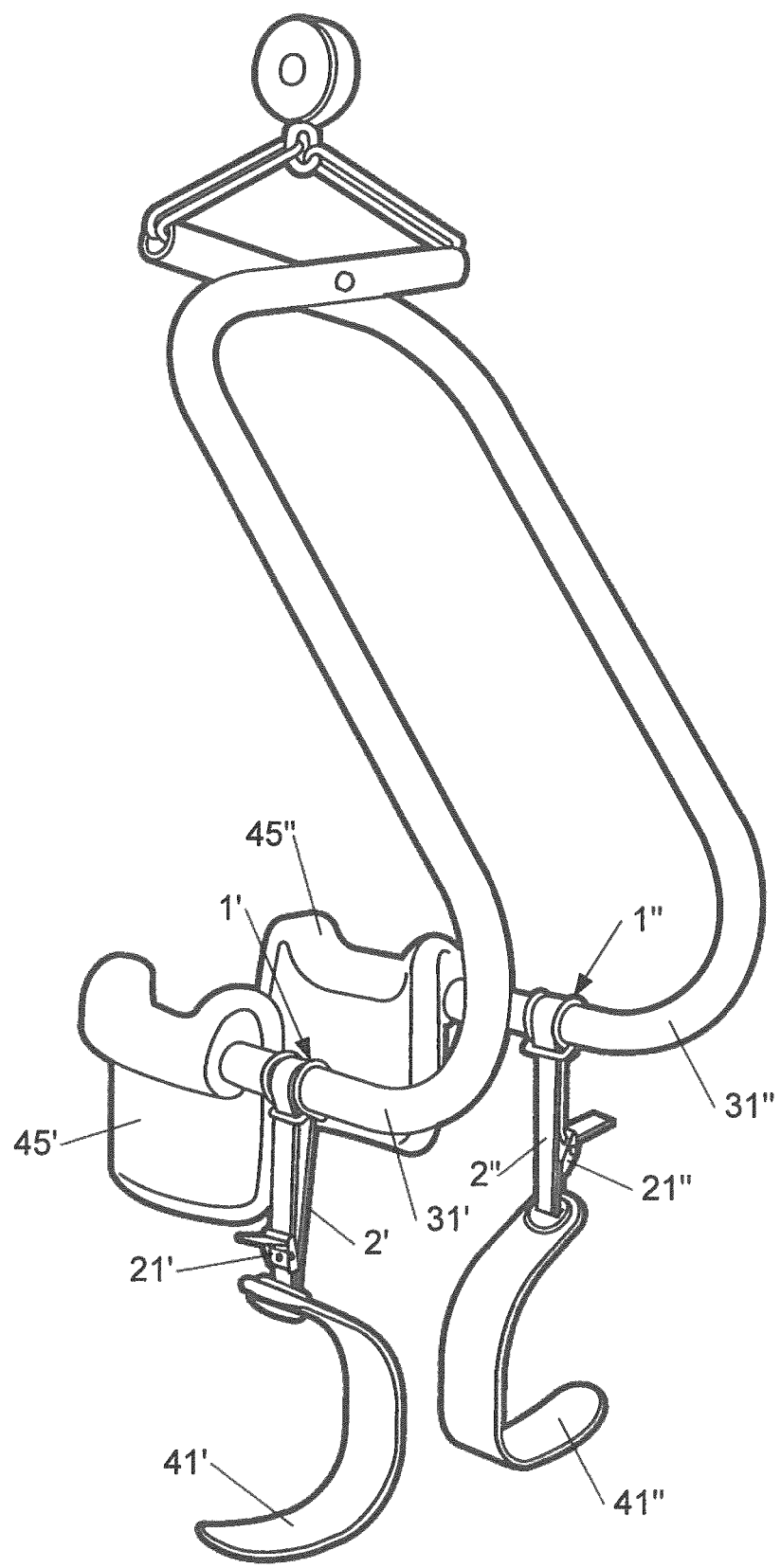
FIG. 13 shows a device for lifting a patient according to an embodiment of the present invention.

FIG. 13 shows a device for lifting a patient according to an embodiment of the present invention. The lifting device comprises a pair of arms 31', 31" on which a pair of clamps 1', 1" are arranged. Two leg supports 41', 41" are suspended from the arms 31', 31" of the lifting device by means of straps 2', 2". The straps 2', 2" run in a loop through the clamps 1 and over the arms 31', 31" of the lifting device. The straps 2', 2" are provided with adjusting elements 21', 21" in the form of a buckle 21', 21". The adjusting elements 21', 21" are provided for adjusting the length of the straps 2', 2", such that the leg supports 41', 41" may be positioned at preferred distances from the arms 31', 31" of the lifting device, as preferred by the patient using the lifting device. When no load is suspended from the straps 2', 2", and possibly after opening the clamps 1', 1", the clamps 1', 1" and the straps 2', 2" may be positioned by the patient or another person at preferred positions along the longitudinal direction of the arms 31', 31" of the lifting device, as preferred by the patient using the lifting device. When a patient is seated in the leg supports 41', 41" with his legs, and thus forms a load, the positions of the clamps 1', 1" and the straps 2', 2" are secured with respect to the arms 31', 31" of the lifting device, such that the clamps 1', 1" and the straps 2', 2" may not move unexpectedly along the arms 31', 31" of the lifting device while the patient is using the lifting device. The arms 31', 31" of the lifting device are also provided with a pair of cups 45', 45". The cups 45', 45" are provided to be positioned underneath the armpits of the patient at opposite sides of the patient's thorax. The cups 45', 45" are shaped at the top surface to grip underneath the armpits of the patient, and are provided with a curvature corresponding with the curvature of the patient's thorax, and they are mounted fixedly on the arms 31', 31" of the lifting device. Alternatively, the cups 45', 45" may also be mounted tiltably on the arms 31', 31" such that their position may be changed according to the patient's thorax.

Figure 14:
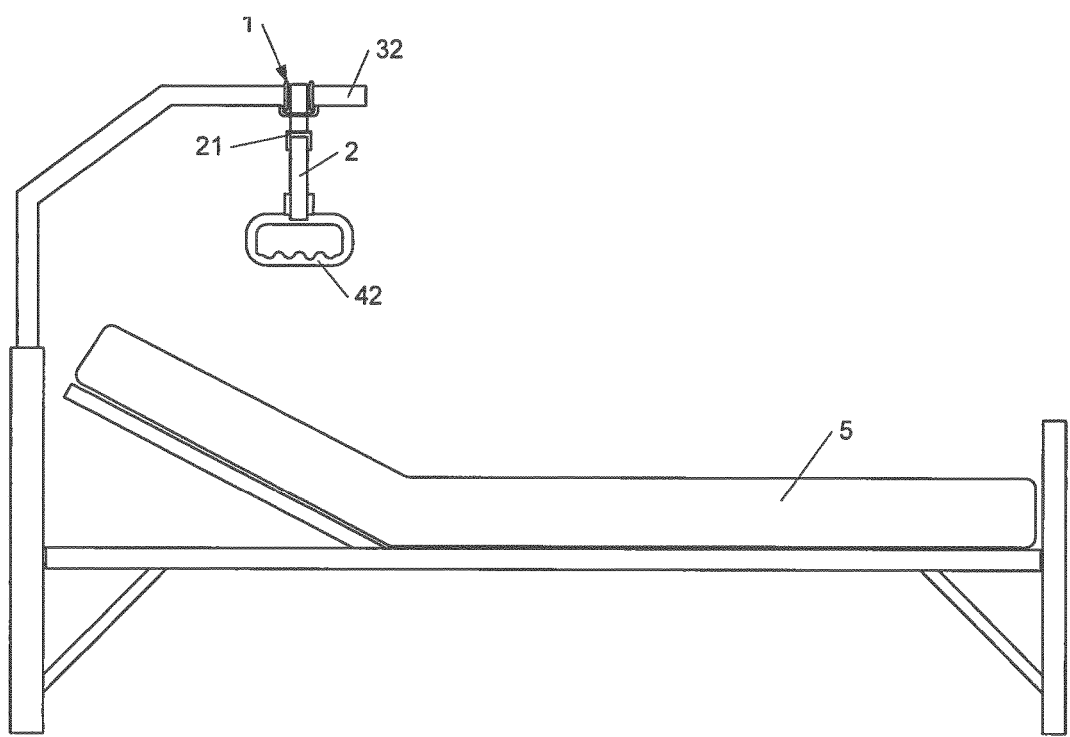
FIG. 14 shows a device for assisting in the positioning or repositioning of a patient in a bed according to an embodiment of the present invention.

FIG. 14 shows a device for assisting in the positioning or repositioning of a patient in a bed 5 according to an embodiment of the present invention. The device comprises an overhead bar 32 on which a clamp 1 is arranged. A handgrip 42 is suspended from the overhead bar 32 by means of a strap 2. The strap 2 runs in a loop through the clamp 1 and over the overhead bar 32. The strap 2 is provided with an adjusting element 21 in the form of a buckle 21. The adjusting element 21 is provided for adjusting the length of the strap 2, such that the handgrip 42 may be positioned at a preferred distance from the overhead bar 32, as preferred by the patient using the device. When no load is suspended from the strap 2, and after opening the clamp 1, the clamp 1 and the strap 2 may be positioned by the patient or another person at a preferred position along the longitudinal direction of the overhead bar 32, as preferred by the patient using the device. When a patient pulls on the handgrip 42, and thus forms a load, the position of the clamp 1 and the strap 2 is secured with respect to the overhead bar 32, such that the clamp 1 and the strap 2 may not move unexpectedly along the overhead bar 32 while the patient is using the device.

LIST OF REFERENCES

1, 1', 1" clamp
11 first contact line
12 second contact line
13 gripping part
14 further gripping part
2, 2', 2" strap
21, 21', 21" adjusting element
22 connection element
3 rod
31', 31" arm
32 overhead bar
41, 41', 41" leg support (support element)
42 handgrip (support element)
43 connection slot on the support element
44 connection recess on the support element
45', 45" cup
5 bed

The invention claimed is:

1. An assembly comprising:
   a clamp and a strap and a rod, the strap having a longitudinal direction, the strap being suitable for directly attaching a load for suspension from at least one of the rod and/or the clamp via at least one end of the strap, the clamp comprising a contractible gripping part provided for gripping around the rod for enabling a clamping of the clamp on the rod, the strap engaging with the clamp along a first contact line and along a second contact line, each contact line crossing the longitudinal direction of the strap, wherein the two parts of the strap adjacent to the first contact line form an angle around the first contact line, such that, when a load is suspended from the at least one end of the strap, the strap exerts a force on the clamp at the first contact line, said force pushing the clamp at the first contact line in a direction relative to the second contact line, said direction representing a closing direction of the clamp, thereby pressing the gripping part against the rod, wherein the gripping part is resilient, and wherein the gripping part is provided with a pretension for pressing against the rod even when no load is suspended from the at least one end of the strap.

2. The assembly according to claim 1, wherein the clamp comprises a further gripping part for gripping around the rod for enabling a clamping on the rod.

3. The assembly according to claim 2, wherein the further gripping part is connected with the gripping part via at least one clamp part selected from the clamp part comprising the first contact line and the clamp part comprising the second contact line.

4. The assembly according to claim 2, wherein the further gripping part is connected at both ends with the gripping part, a first connection passing via the clamp part comprising the first contact line and a second connection passing via the clamp part comprising the second contact line.

5. The assembly according to claim 4, wherein the further gripping part grips around the rod at a distance from where the gripping part grips around the rod.

6. The assembly according to claim 5, wherein the strap passes through the clamp in between the gripping part and the further gripping part.

7. The assembly according to claim 2, wherein the further gripping part is resilient.

8. The assembly according to claim 7, wherein the further gripping part is provided with a pretension for pressing against the rod even when no load is suspended from the at least one end of the strap.

9. The assembly according to claim 1, wherein the first contact line and the second contact line run substantially parallel with respect to each other.

10. The assembly according to claim 1, wherein the clamp comprises a holding element adapted for preventing the strap from sliding with respect to the clamp over the rod along a direction parallel to a longitudinal axis of the rod when the strap is exerting a force on the clamp along the first contact line and along the second contact line.

11. The assembly according to claim 1, wherein the clamp is provided such that, when no load is suspended from the strap, the clamp is manually pushable at the first contact line in a direction relative to the second contact line and opposite to the closing direction of the clamp, said direction representing an opening direction of the clamp, thereby releasing gripping pressure from the gripping part against the rod.

12. The assembly according to claim 1, wherein the strap is suitable for directly attaching a load for suspension from the rod via at least one end of the strap.

13. The assembly according to claim 1, wherein the clamp is arranged such that the force exerted on the clamp at the first contact line, when a load is suspended from the at least one end of the strap, pushes the clamp at the first contact line in a direction away from the second contact line.

14. The assembly according to claim 1, wherein the two parts of the strap adjacent to the second contact line form an angle around the second contact line, such that, when a load is suspended from at least one end of the strap, the strap exerts a further force on the clamp at the second contact line, said further force pushing the clamp at the second contact line in a direction relative to the first contact line, said direction representing the closing direction of the clamp, thereby pressing the gripping part against the rod.

15. The assembly according to claim 1, wherein the angle around the first contact line formed by the two parts of the strap adjacent to the first contact line is in the range from 90° to 170°.

16. The assembly according to claim 1, wherein the force exerted by the strap on the clamp at the first contact line when a load is suspended from the at least one end of the strap is in the range from 5 N to 2000 N.

17. The assembly according to claim 1, wherein the first contact line and the second contact line cross the longitudinal direction of the strap at an angle in the range from 45° to 135°.

18. The assembly according to claim 1, wherein the clamp is manufactured from a material selected from the list consisting of plastic, fiber reinforced plastic, metal, iron, steel, stainless steel, spring steel and stainless spring steel.

19. The assembly according to claim 1, wherein the clamp is a single integral part.

20. The assembly according to claim 1, wherein the clamp is manufactured from a bent wire.

21. The assembly according to claim 1, wherein at least a part of the surface of the clamp which is provided for clamping on the rod (3) is provided with an anti-slip finishing.

22. The assembly according to claim 1, wherein at least a part of the surface of the clamp which is provided for contacting the strap is provided with an anti-slip finishing.

23. The assembly according to claim 1, wherein the strap forms a loop.

24. The assembly according to claim 1, wherein the strap is provided with an adjusting element for adjusting the length of the part of the strap from which the load is to be suspended.

25. The assembly according to claim 1, wherein the assembly further comprises a support element connected to the at least one end of the strap, which support element is provided for supporting a load which is to be suspended from the at least one end of the strap.

26. The assembly according to claim 25, wherein the support element is connected to the at least one end of the strap by a connection element provided on the at least one end of the strap and by a connection slot on the support element, wherein the connection element and the connection slot cooperate for forming the connection.

27. The assembly according to claim 26, wherein the connection element and the connection slot are dimensioned such that the connection element, in a first orientation of the connection element, is able to pass through the connection slot to allow connecting and disconnecting of the strap and the support element, and such that the connection element, in a second orientation of the connection element, seats behind the sides of the connection slot for connecting the strap and the support element.

28. A device for lifting a patient comprising two arms for gripping the patient from opposite sides of the patient's thorax and being shaped accordingly, and whereby from the arms leg supports are suspended with straps by the assembly according to claim 1.

29. A device for assisting in the positioning of a patient in a bed comprising a handgrip and a strap which is attached to the handgrip and suspended from an overhead bar above the bed by the assembly according to claim 1.

30. A method for manufacturing the assembly according to claim 1, the method comprising:
providing a material for forming the clamp; and
forming the clamp of the assembly by shaping the material for forming the clamp to a predetermined shape comprising the gripping part, the part of the clamp which comprises the first contact line and the part of the clamp which comprises the second contact line.

31. The method according to claim 30, wherein the predetermined shape further comprises the further gripping part.

32. The method according to claim 30, wherein the material for forming the clamp is a plastic, and wherein the step of forming the clamp comprises injection moulding the plastic to the predetermined shape.

33. The method according to claim 30, wherein the material for forming the clamp is a metal wire having a first end and a second end, and wherein the step of forming the clamp comprises bending the metal wire to the predetermined shape.

34. The method according to claim 33, wherein the metal wire is bent such that the first end and the second end of the metal wire are approaching each other, and wherein the method further comprises the step of welding the first end and the second end of the metal wire to each other.

35. The method according to claim 30, further comprising:
providing a rod;
providing a strap having a longitudinal direction; and
arranging the clamp and the strap on the rod with the gripping part and, if present, the further gripping part gripping around the rod, and with the strap engaging with the clamp along the first contact line and along the second contact line.

36. The method according to claim 35, further comprising:
providing a support element which is provided for supporting a load which is to be suspended from the at least one end of the strap; and
connecting the support element to the at least one end of the strap from which the load is to be suspended.

37. The method according to claim 36, wherein the rod is an arm of a device for lifting a patient, and wherein the support element is a leg support of the device for lifting a patient.

38. The method according to claim 36, wherein the rod is an overhead bar of a device for assisting in the repositioning of a person in a bed, and wherein the support element is a handgrip of the device for assisting in the repositioning of a person in a bed.

39. The assembly according to claim 14, wherein the angle around the second contact line formed by the two parts of the strap adjacent to the second contact line is in the range from 90° to 170°.

40. The assembly according to claim 14, wherein the further force exerted by the strap on the clamp at the second contact line when a load is suspended from the at least one end of the strap, is in the range from 5 N to 2000 N.

* * * * *